June 2, 1936.  J. LATZKO ET AL  2,042,667
LIVING DIAGRAM
Filed March 15, 1930
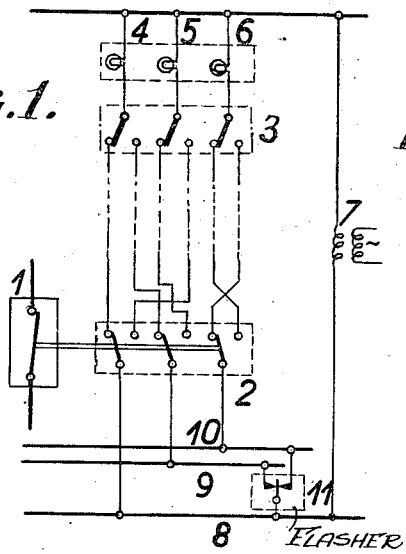
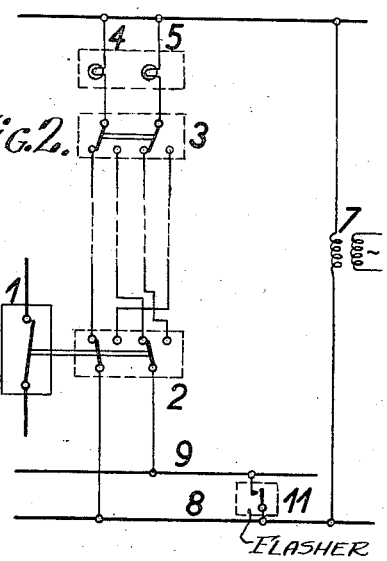
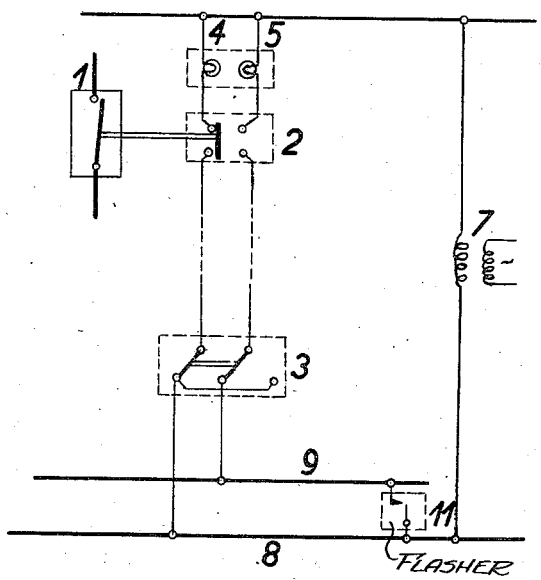
Inventors
Johann Latzko
Otto Plechl
By Alfred H. Dyson
Attorney.

Patented June 2, 1936

2,042,667

UNITED STATES PATENT OFFICE 2,042,667

LIVING DIAGRAM

Johann Latzko, Vienna, and Otto Plechl, Paffstatten, Austria, assignors to Aktiengesellschaft Brown, Boveri & Cie., Baden, Switzerland, a joint-stock company of Switzerland Application March 15, 1930, Serial No. 436,170
In Austria March 19, 1929

7 Claims. (Cl. 177—311)

In electrical power stations and in distributing plants of similar description so-called living diagrams find extensive application for the supervision of the operating conditions existing in said plants. Such living diagrams are often built as illuminated diagrams. In order to simplify the description of the improvements proposed in the following, the specialized form of the invention is considered in its application to electrical distributing plants, although the described idea of the invention is also applicable to all other designs of living diagrams.

In such a distributing plant it is well known that the conditions in respect to the position of the apparatus in the system may change without action on the part of the operator, for example, by the automatic tripping of a circuit breaker. If the position of the actual portion of the plant be shown on the living diagram which represents it, by an "indicator", the appearance of which alters from one to a second form (for example colour) the attendant would be required to hold continuously in memory the position of the living diagram in order that such a change would not escape his notice. Even an acoustic signal operated by a change of conditions would not suffice since it would still be necessary for the observer to compare the altered diagram with its appearance prior to the change by reconstructing the same from memory in order to ascertain the extent of the said change. For this reason the indicators in the living diagram representing the separate portions of the system are constructed in such a manner that their appearance may alter between three forms (for example colours).

In the following, in order to simplify the description, the form involving a plurality of colours adopted by the indicators is assumed.

When the indicator assumes the third colour, this denotes an alteration in the conditions. By the actuation of a switch (acknowledging switch) the third colour, that is to say the "change colour", is replaced by the colour actually representing the new conditions existing, the operation being termed "acknowledging change of conditions".

This form of representation however has in some circumstances the disadvantage that the observer must have first actuated the said acknowledging switch before the living diagram can assume the form representing the changed conditions.

The same is applicable to other types of living diagrams in which the conditions existing at special portions of the system are denoted by the form assumed by their indicators which indicators, serving at the same time as acknowledging switches, are illuminated in a single colour, any alteration of conditions being recognizable by a flickering illumination of the said indicators. The indicators instead of being illuminated with a steady light are therefore illuminated with a flickering light when their condition no longer corresponds to that of the portion of the system they represent. Thus also in this case the acknowledging switches must be actuated before it is possible to determine, without considerable extra thought the actual conditions existing in the system.

In accordance with the present invention the appearance assumed by the indicators upon the occurrence of an alteration of conditions periodically alternates between the appearance denoting the conditions prior to the alteration and that denoting the new existing conditions. An indicator representing for example a circuit breaker, the "in" and "out" position of which is perhaps signified by the colours red and green respectively, will be illuminated in a third colour, for example white, when its position alters. The alteration of position of the circuit breaker will then be represented by the alternating illumination of its indicator in the colours red and white or green and white, according to whether the circuit breaker has closed or opened. In this manner the observer is advised not only of the conditions existent prior to the change but also of those which actually exist afterwards in the system.

For reasons apart from those given above it is advisable that the appearance of the indicator be made to assume a fourth form (for example colour) when a fault arises in the apparatus forming the living diagram itself. With illuminated living diagrams this fourth form may, preferably, be indicated by the unilluminated, i. e. dark condition of the indicator. The colour representing an alteration and that, denoting a fault may be so combined that upon occurrence of an alteration of conditions, the colour determined by the new position will be indicated by the intermittent illumination of the indicator. In this manner all the above mentioned disadvantages are completely overcome since as soon as a fault occurs the colours representing the different positions will not appear. When an alteration has been acknowledged the indicators will be continuously illuminated. Upon the occurrence of an alteration of conditions, however, the indicators of the faulty portion will be instantly intermittently illuminated with the colour representing the new condition. Thus these indicators can be distinguished and the observer visually advised as to the extent of the alteration which has occurred.

A further embodiment of the invention comprises the provision of means whereby the alteration of conditions is denoted by the alternating occurrence of the two colours denoting the old and new positions. In order that the final position may be distinguished the two colours do not appear for equal periods of time, the period of illumination of one colour is made greater than that of illumination of the other appears, according to the direction in which the change has taken place.

In the drawing:—

Fig. 1 is a diagrammatic representation of the form of the invention characterized by the feature that the alteration of conditions is represented by the alternating appearance of two indications, the one a special indication denoting alteration of conditions and the other the indication denoting the new condition. The apparatus, the position of which is to be supervised, for example the circuit breaker 1, is provided with auxiliary contacts 2. 3 is the aknowledging switch, 4, 5 and 6 the differently coloured signal lamps, 7 is a transformer connected to the alternating current supply. Any other desired source of supply may be used instead of the transformer 7. A flicker device is inserted between the buses 8 and 9 and between the buses 8 and 10. As long as the position of circuit breaker 1 coincides with that of the acknowledging switch 3 the signal lamp denoting the position of the circuit breaker will be continuously illuminated. Thus in the position illustrated by the drawing Figure 1, the position lamp 4 denoting "closed" is provided with current from the bus 8. If the circuit breaker trips, the auxiliary contacts 2 will be moved to the right and the signal lamp 5 symbolizing "open" will be in circuit with the flicker bus 9 and the signal lamp 6 signifying "alteration of conditions" will be in circuit with the bus 10. The flicker device is so arranged that both lamps are alternately illuminated. If the acknowledging switch 3 be actuated, the signal lamp 6 will be extinguished while the signal lamp 5 will be continuously illuminated from the bus 8. In a similar manner the signal lamps 4 and 6 will be alternately illuminated when the circuit breaker 1 is reclosed. The change is acknowledged by the actuation of the acknowledging switch 3. Any fault in the contacts or a break in the pilot leads will be evidenced by the non-illumination of the lamp concerned.

Figure 2 is a diagrammatic representation of the embodiment of the invention characterized by the feature that the alteration of conditions is represented by the alternating appearance of indications, the one appearance denoting the new condition and the other denoting disturbance (lamp dark). The only difference in the connections between the embodiment illustrated in Fig. 2 and the embodiment illustrated in Fig. 1 is the omission of some details from Fig. 1. The coincidence between the position of the supervised circuit breaker and that of the acknowledging switch causes the lamp in question to be continuously illuminated. Non-coincidence of the positions of the pieces of apparatus is represented by the intermittent illumination of the lamp denoting the existing position.

Figure 3 is a diagrammatic representation of a further embodiment of the invention characterized by the feature that by means of a re-arrangement of the circuit breaker auxiliary contacts and of the acknowledging switch the number of pilot leads as compared with the embodiment illustrated in Fig. 2 is considerably reduced and a lesser number of auxiliary contacts required for the circuit breaker. In a manner similar to that described with respect to Fig. 2 the coincidence of the position of the supervised circuit breaker or its auxiliary contacts with that of the acknowledging switch causes the lamp in question to be continuously illuminated and to be intermittently illuminated by non-coincidence of the said switch positions.

In place of signal lamps other forms of indicators may be employed, for example, the well known electrically operated mechanical position indicators. These are for the most part provided with a particular position denoting no voltage (disturbance position). If the two windings of such a position indicator be connected in place of the two lamps in Fig. 2, the coincidence of the two switch positions previously mentioned will cause the position indicator to assume a position denoting the existing condition while non-coincidence will cause it to oscillate between the disturbance position and that of the new condition.

Having now particularly described and ascertained the nature of our said invention and in what manner the same is to be performed, we claim as our invention:—

1. In a system of the character described, the combination with a plurality of indicators, and a source of energy therefor, of means comprising a plurality of devices each adjustable to and from one and another position and having elements operable to conjointly control thereat the operative connection of said source of energy with said indicators, characterized by the fact that the adjustment of each of said devices to the one position thereof actuate the said elements thereof to conjointly establish operative connection of said source of energy with one of said indicators, the adjustments of one of said devices to the one position thereof and the adjustment of another of said devices to the another position thereof actuate the said elements thereof to conjointly establish operative connection of said source of energy with the said one and a second one of said indicators, and the adjustment of the said one of said devices to the another position thereof and the adjustment of the said another of said devices to the said one position thereof actuate the said elements thereof to conjointly establish operative connection of said source of energy with the said second one and a third one of said indicators.

2. In a system of the character described, the combination with a plurality of indicators, and a source of energy therefor, of means comprising a plurality of devices each adjustable to and from one and another position and having elements operable to conjointly control thereat the operative connection of said source of energy with said indicators, characterized by the fact that the adjustment of each said devices to the one position thereof actuate the said elements thereof to conjointly establish operative connection of said source of energy with one of said indicators, the adjustment of each of said devices to the another position thereof actuate the said elements thereof to conjointly establish operative connection of said source of energy with a second one of said indicators, the adjustment of the said one of said devices to the another position thereof and the adjustment of the said another of said devices to the one position thereof actuate the said elements thereof to conjointly establish operative connection of said source of energy with the said second one and a third one of said indicators, and the adjustment of the said one of said devices to the one position thereof and the adjustment of the said another of said devices to the another position thereof actuate the said elements thereof to conjointly establish operative connection of said source of energy with the said first one and the said third one of said indicators.

3. In a system of the character described, the combination with a plurality of devices each adjustable to and from one and another position, means for indicating the adjusted positions of one of said devices, and a source of energy for actuating said means, of means comprising an interrupter device, and elements movable by said devices to positions corresponding to the said positions thereof operable to conjointly control the operative connection of said source with the first said means, characterized by the fact that the adjustment of each of said devices to the one position thereof actuate the said elements to positions to establish thereat the operative connection of said source with the first said means to the exclusion of said interrupter device to thereby cause continuous operation of the first said means, and the adjustment of the said one of said devices to the said one position thereof and the adjustment of another of said devices to the said another position thereof move said elements to positions to establish thereat such operative connection of said source with the first said means as to include therein said interrupter device to thereby cause continual intermittent operation of the first said means.

4. In a system of the character described, the combination with a plurality of devices each independently adjustable to and from one and another position, a plurality of indicators operable to denote the adjusted positions of one of said devices, and a source of energy for actuating said indicators, of means comprising an interrupter device, and elements adjustable by said devices to positions corresponding to the said positions thereof operable to conjointly control the operative connection of said source with said indicators, characterized by the fact that the adjustment of each of said devices to the one position thereof actuate the said elements to positions to establish thereat the operative connection of said source with one of said indicators to the exclusion of said interrupter device to thereby cause continuous operation of such said indicator, and the adjustment of the said one of said devices to the one position thereof and another of said devices to the another position thereof actuate said elements to positions to establish thereat such operative connection with the said one and another of said indicators as to include therein the said interrupter device to thereby cause the continual alternate operation of the said one and another of said indicators.

5. In a system of the character described, the combination with a plurality of devices each independently adjustable to and from one and another position, a plurality of indicators operable to denote the adjusted positions of one of said devices, and a source of current for actuating said indicators, of means comprising an interrupter device and elements adjustable by said devices to positions corresponding to the said positions thereof operable to conjointly control the operative connection of said source with said indicators, characterized by the fact that the adjustment of each of said devices to the one position thereof actuate the said elements to positions to establish thereat the operative connection of said source with one of said indicators to the exclusion of said interrupter device to thereby cause continuous operation of such said indicator, the adjustment of the said one of said devices to the said one position thereof and the adjustment of another of said devices to the said another position thereof actuate the said elements to positions to establish thereat such operative connection of said source with the said one and a second one of said indicators as to include therein the said interrupter device to thereby cause the continual alternate operation of the said one and the said second one of said indicators, and the adjustment of each of said devices to the said another position thereof actuate the said elements to positions to establish thereat the operative connection of said source with a third one of said indicators to the exclusion of said interrupter device to thereby cause the continuous operation of the said third one of said indicators.

6. In a system of the character described, the combination with a plurality of devices each independently adjustable to and from one and another position, a plurality of indicators operable to denote the adjusted positions of one of said devices, and a source of current for actuating said indicators, of means comprising an interrupter device and elements adjustable by said devices to positions corresponding to said positions thereof operable to conjointly control the operative connection of said source with said indicators, characterized by the fact that the adjustment of each of said devices to the one position thereof actuate the said elements to positions to establish thereat the operative connection of said source with one of said indicators to the exclusion of said interrupter device to thereby cause continuous operation of such said indicator, the adjustment of the said one of said devices to the said one position thereof and the adjustment of another of said devices to the said another position thereof actuate the said elements to positions to establish thereat such operative connection of said source with the said one and a second one of said indicators as to include therein the said interrupter device to thereby cause the continual alternate operation of the said one and the said another of said indicators, the adjustment of said devices to the said another position thereof actuate the said elements to positions to establish thereat the operative connection of said source with a third one of said indicators to the exclusion of said interrupter device to thereby cause the continuous operation of the said third one of said indicators, and the adjustment of the said one of said devices to the another position thereof and the adjustment of the said another of said devices to the one position thereof actuate the said elements to positions to establish thereat such operative connection of said source with the said second one and the said third one of said indicators as to include therein the said interrupter device to thereby cause the continual alternate operation of the said second one and the said third one of said indicators.

7. In a system of the character described, the combination with a plurality of devices each independently adjustable to and from one and another position, a plurality of indicators operable to indicate the adjusted positions of one of said devices relative to the adjusted position of another of said devices, and a source of current for actuating said indicators, of means comprising an interrupter device and elements adjustable by said devices to positions corresponding to said positions thereof operable to conjointly control the operative connection of said source with said indicators, characterized by the fact that the adjustment of each of said devices to the one position thereof actuate the said elements to positions to establish thereat the operative connection of said source with one of said indicators to the exclusion of said interrupter device to thereby cause the continuous operation of such said indicator, the adjustment of the said one of said devices to the one position thereof and the adjustment of the said another of said devices to the another position thereof actuate the said elements to such positions as to establish thereat such connection of said source with the said one of said indicators as to include therein the said interrupter device to thereby cause the continual operation of the said one of said indicators, the adjustment of each of said devices to the said another position thereof actuate the said elements to positions to cause the operative connection of said source with a second one of said indicators to the exclusion of said interrupter device to thereby cause the continuous operation of the said second one of said indicators, and the adjustment of the said one of said devices to the another position thereof and the adjustment of the said another of said devices to the one position thereof actuate the said elements to such positions as to establish thereat such operative connection of said source with the said second one of said indicators as to include therein the said interrupter device to thereby cause the continual operation of the said second one of said indicators.

JOHANN LATZKO.
OTTO PLECHL.